Figure 1:
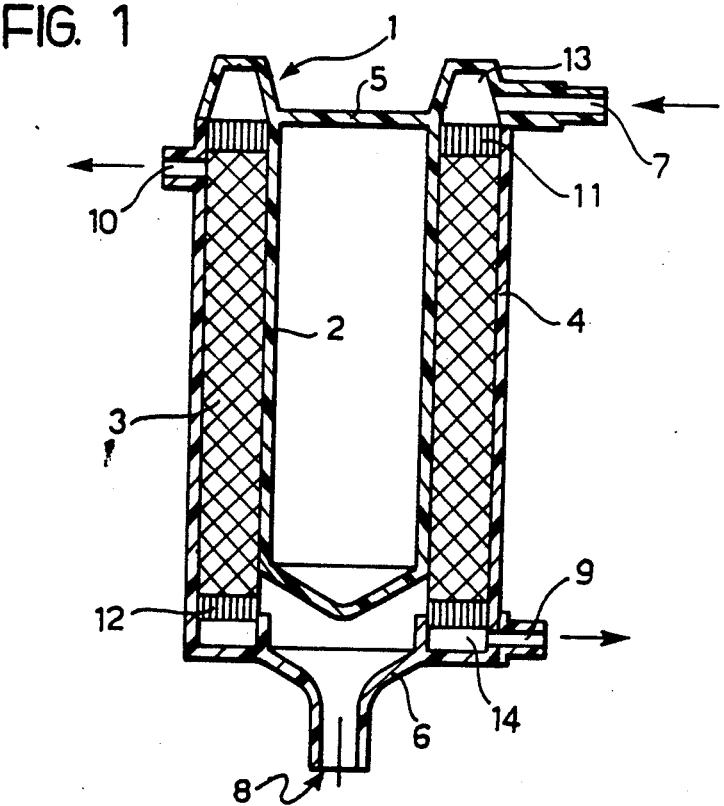

United States Patent [19]

Zantonelli et al.

[11] Patent Number: 4,952,312

[45] Date of Patent: Aug. 28, 1990

[54] METHOD FOR WINDING THE FIBRES OF EXCHANGE DEVICES, SUCH AS BLOOD OXYGENATORS AND THE LIKE, AND AN EXCHANGE DEVICE PRODUCED BY THIS METHOD

[75] Inventors: Piero Zantonelli, Borgosesia; Sergio Graglia, Torrazza Piemonte, both of Italy

[73] Assignee: Sorin Biomedica S.p.A., Vercelli, Italy

[21] Appl. No.: 275,378

[22] Filed: Nov. 23, 1988

[51] Int. Cl.$^5$ .................. B01D 63/10; B01D 69/08
[52] U.S. Cl. .................. 210/321.74; 210/321.79;
210/321.83; 210/321.88; 210/497.1; 242/7.02;
242/7.21; 422/48
[58] Field of Search ............ 210/209, 497.1, 321.74,
210/321.79, 321.8, 321.83, 321.88, 321.89;
242/7.01, 7.02, 7.21; 422/45, 48; 264/103

[56] References Cited

U.S. PATENT DOCUMENTS

| 3,422,008 | 1/1969 | McLain . | |
|---|---|---|---|
| 3,794,468 | 2/1974 | Leonard | 210/321.79 |
| 4,045,851 | 9/1977 | Ashare et al. | 210/321.74 |
| 4,336,138 | 6/1982 | Taniyama et al. | 210/321.88 |
| 4,351,092 | 9/1982 | Sebring et al. | 210/497.1 |
| 4,368,124 | 1/1983 | Brumfield | 210/321.79 |
| 4,430,219 | 2/1984 | Kuzumoto et al. | 210/321.88 |
| 4,572,446 | 2/1986 | Leonard et al. | 242/7.02 |
| 4,660,779 | 4/1987 | Nemesi et al. | 242/7.02 |
| 4,824,566 | 4/1989 | Thibos | 210/497.1 |
| 4,838,970 | 6/1989 | Thibos | 210/321.74 |

FOREIGN PATENT DOCUMENTS

| 0187708 | 7/1986 | European Pat. Off. . |
| 2441333 | 3/1975 | Fed. Rep. of Germany . |
| 2900603 | 7/1979 | Fed. Rep. of Germany . |
| 2340892 | 9/1977 | France . |
| 2380362 | 9/1978 | France . |
| 233946 | 3/1986 | German Democratic Rep. . |
| 1481064 | 7/1977 | United Kingdom . |
| 2012187 | 7/1979 | United Kingdom . |
| 1583015 | 1/1981 | United Kingdom . |

Primary Examiner—W. Gary Jones
Attorney, Agent, or Firm—Hedman, Gibson, Costigan & Hoare

[57] ABSTRACT

The fibre (3) is wound in several layers at a variable winding pitch so that the angle winding ($\alpha$) is kept substantially constant. The length wound in each layer and the angle at which the various layers cross each other thus remain substantially constant.

The winding pitch (p) is variable according to the equation:

$$P = P_1 + 2\pi \cdot \Delta r \tan \alpha$$

where:
$P_1$ is the pitch at which the innermost layer is wound,
$\alpha$ is the substantially constant winding angle, and
$\Delta r$ is the increase in the winding radius corresponding to the layer which is being wound.

6 Claims, 2 Drawing Sheets

METHOD FOR WINDING THE FIBRES OF EXCHANGE DEVICES, SUCH AS BLOOD OXYGENATORS AND THE LIKE, AND AN EXCHANGE DEVICE PRODUCED BY THIS METHOD

DESCRIPTION

The present invention relates in general to exchange devices comprising at least one fibre wound in several layers around a winding axis..

A structural solution of this type is adopted, for example, for ducts of blood oxygenators which are used in the surgical field to replace the function of the lungs during operations in which extracorporeal circulation is established.

The problem of producing a fibre winding which enables the blood oxygenator to function correctly has been confronted several times in the past.

By way of reference, for example, U.S. Pat. Nos. 3,422,008 and 4,368,124, as well as European patent application No. 0,187,708, may be mentioned.

Known winding solutions usually provide for the fibre to be wound at a constant pitch and thus produce a system in which the length of fibre wound in each layer (that is the length of fibre between the ends of the winding itself in each layer thereof) increases as the diameter of the winding increases. The angles at which the windings in successive layers cross each other consequently tend to decrease gradually towards the outer layers of the winding.

This winding solution is not, however, considered satisfactory, particularly in relation to any oxygenator such as that indicated 1 in FIG. 1.

More particularly, this is an oxygenator of the type in which the oxygen-bearing flow is intended to pass through the hollow blood-oxygen exchange fibres while the blood flow being oxygenated flows outside them.

For greater clarity, the structure (which is known) of the device 1 shown schematically in FIG. 1 will be described in brief.

The device 1 is constituted essentially by a sealed casing, usually of plastics material, with a central core 2 around which is wound a bundle of hollow exchange fibres 3. The fibre bundle is in turn surrounded by the generally-tubular outer casing 4 of the device.

The ends of the casing 4 are closed by two end parts 5, 6 in which two inlet connectors 7 and 8 are provided for the oxygen-bearing flow and for the blood respectively.

A further two outlet connectors 9 and 10 for the oxygen and the oxygenated blood respectively are also provided in the side wall of the casing 4 or in its end parts 5, 6.

At the ends of the casing 4, the fibres 3 are incorporated in annular sealing masses 11 and 12 which, together with the end parts 5 and 6, define corresponding distribution chambers 13 and 14 which are also annular and communicate with the oxygen inlet and outlet connectors 7 and 9 respectively.

The sealing masses 11 and 12 seal the chambers 13 and 14 from other parts of the device 1 but the ends of the fibres 3 pass through them so that the cavities within the fibres communicate with the chambers 13 and 14. The oxygen-bearing flow can thus pass through the cavities within the fibres 3.

The flow of blood to be oxygenated enters the device 1 through the connector 8 which is situated centrally of the end part 6. The blood flow is then deflected by that end of the core 2 (usually conical) facing the connector 8 and diffuses into the bundle of fibres 3. The outer surfaces of the latter are thus bathed by the blood to be oxygenated which finally emerges from the device 1 through the connector 10.

An exchange thus takes place through the semipermeable walls of the fibres 3 which causes the oxygenation of the blood and the simultaneous removal of carbon dioxide therefrom.

This exchange mechanism is also used in oxygenators in which the blood flows within the fibres and the oxygen-bearing flow bathes the exterior of the fibres.

The solution illustrated in FIG. 1 (oxygen inside and blood outside) is preferable, however, in terms of the exchange efficiency and the smaller dimensions of the device.

Various methods may be used to form the fibre bundle 3.

For example, several fibres may be grouped to form a strip or band which is wound along a generally-helical path around the core 2. Another possibility, which is that referred to explicitly in the following description, is the formation of the winding from a single fibre wound in several layers around the core 2. This solution is preferred since it enables any breakages in the fibre to be detected immediately. In use these could result in oxygen loss which is very dangerous because of the possible formation of bubbles which in turn can cause clotting and embolisms in the patient's body.

Figure 2:
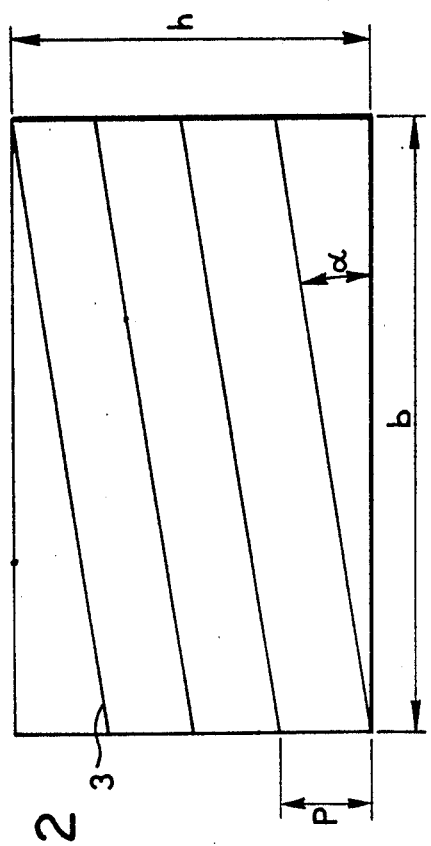
Figure 3:
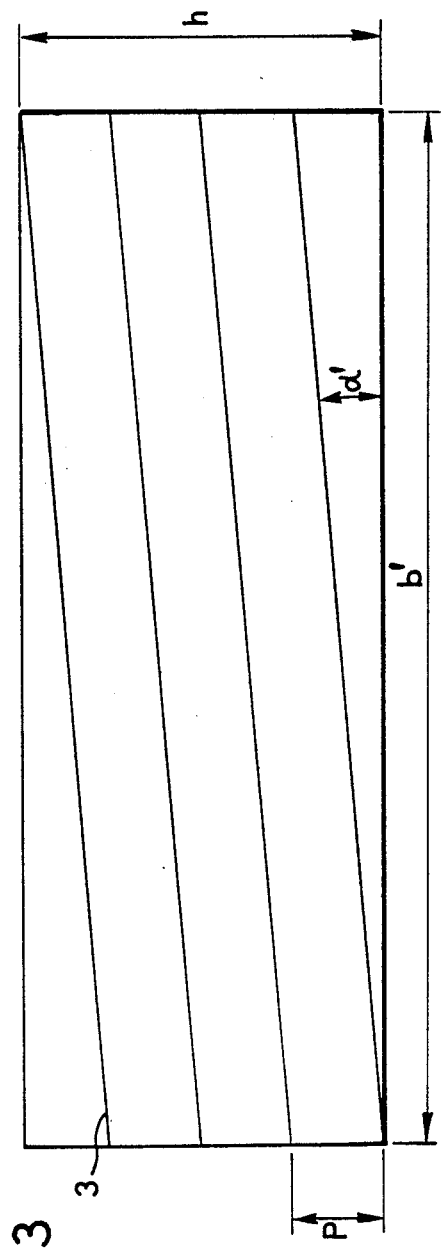

FIGS. 2 and 3 show cylindrical surfaces around which the fibre 3 is wound, developed in imaginary planes.

In the case of FIG. 2, the surface has a circumference of b. This circumference may, for example, be that of the core 2 of FIG. 1 so that FIG. 2 corresponds to the first layer of winding of the fibre 3 around the core 2.

FIG. 3, however, relates to a winding surface of circumference b. This may, for example, correspond to the nth layer of the fibre winding.

Thus $$b' = b + 2\pi \cdot \Delta r \tag{1}$$

where $\Delta r$ is the increase in the winding radius and can be expressed by the equation $$\Delta r = nd \tag{2}$$

where n is the number of layers wound and d is the diameter of the fibre 3.

In general the length of the fibre 3 wound in each layer, that is the length of that portion of the fibre in each layer between the two ends of the winding which are a distance h apart, can be expressed by the equation $$L = h/\sin\alpha \tag{3}$$

where $\alpha$ is the winding angle, that is, the angle between the fibre and any plane perpendicular to the central axis of the core on which the fibre is wound.

From a comparison of FIG. 2 and FIG. 3, it is immediately clear that when the fibre is wound (according to known solutions) along a helical path with a constant pitch p, that is with each turn of the winding covering a portion p of the axial length h of the winding, the angle α tends to decrease gradually (α→α') as the winding radius (Δr) gradually increases.

Consequently, the length L of fibre wound, given by equation (3), tends to increase gradually towards the outer layers.

The gradual decrease in the winding angle α and the consequent increase in the winding length L towards the outer layers has various disadvantages.

In the first place the angle at which adjacent layers of fibres cross each other varies.

This is not considered the best arrangement since it is known that optimum efficiency is achieved in a multi-tube exchanger when all the paths of both fluids are as homogeneous as possible throughout the exchange volume.

In the particular case of a blood oxygenator, such as the device of FIG. 1, in which the blood circulates outside the fibres there are two further considerations which make greater homogeneity preferable.

The first consideration results from the particular nature of the blood. Its viscosity is not constant because of the presence of the red corpuscles but varies in dependence on its conditions of movement and hence on the cross-sections of the ducts through which it is made to flow. Local velocities which are too high or too low (stasis) can have damaging effects. For this reason an arrangement with aperture cross-sections which are as constant as possible is preferable.

A second consideration results from the need to prevent the total pressure of the oxygen-bearing flow (usually gaseous oxygen) within the fibres from exceeding that of the blood outside the fibres. If this were, in fact, to occur, the oxygen could pass not only by diffisuion but also as a result of the formation and transfer of bubbles. As noted above, if these bubbles are not trapped before the blood is put back into circulation, they could create embolisms in the patient's body.

It is therefore necessary to keep the inlet pressure of the gas (connector 7) very low and little higher than atmospheric pressure (typically a few cm of water). Under these conditions, the fact that the length of the fibre 3 wound in the various layers is not constant prevents the operating conditions of the oxygenator from being optimised.

In fact the oxygen flow rate in a single fibre under normal flow conditions is given by an equation of the type:

$$f = k \cdot \frac{\rho^4 \Delta P}{\eta L} \quad (4)$$

where ρ is the internal radius of the hollow fibre, L is its length, η is the viscosity of the fluid in the fibre and Δ P is the pressure difference between the inlet and the outlet. If the outlet is at atmospheric pressure, Δ P represents the difference between the inlet pressure and the atmospheric pressure. Equation (4) clearly shows that the oxygen flow rate is inversely proportional to the length L of the fibre. Consequently, in the winding of a device such as that of FIG. 1, the oxygen flow rate and thus the efficiency of exchange with the blood, gradually decreases as the distance from the core 2 increases.

The object of the present invention is to remedy the disadvantages described above.

According to a first aspect of the invention, this object is achieved by means of a method for forming a fibre winding for an exchanger in which at least one fibre is wound in several layers around a winding axis, characterised in that the fibre is wound at a substantially constant angle to the axis. The length wound in each layer and the angle at which successive layers cross each other thus remain substantially constant.

Another aspect of the present invention concerns an exchanger including at least one fibre wound in several layers around a winding axis, characterised in that the at least one fibre is at a substantially constant winding angle to the axis, the length of fibre wound in each layer being substantially constant.

The at least one fibre is preferably a hollow blood-oxygen-exchange fibre and the exchanger preferably includes means for supplying an oxygen-bearing flow to the interior of the fibre and a blood flow to be oxygenated which is intended to flow over the outside of the fibres.

One embodiment of the invention will now be described, purely by way of non-limiting example, with reference to the appended drawings, in which:

FIGS. 1 to 3 have already been considered above, and

Figure 4:
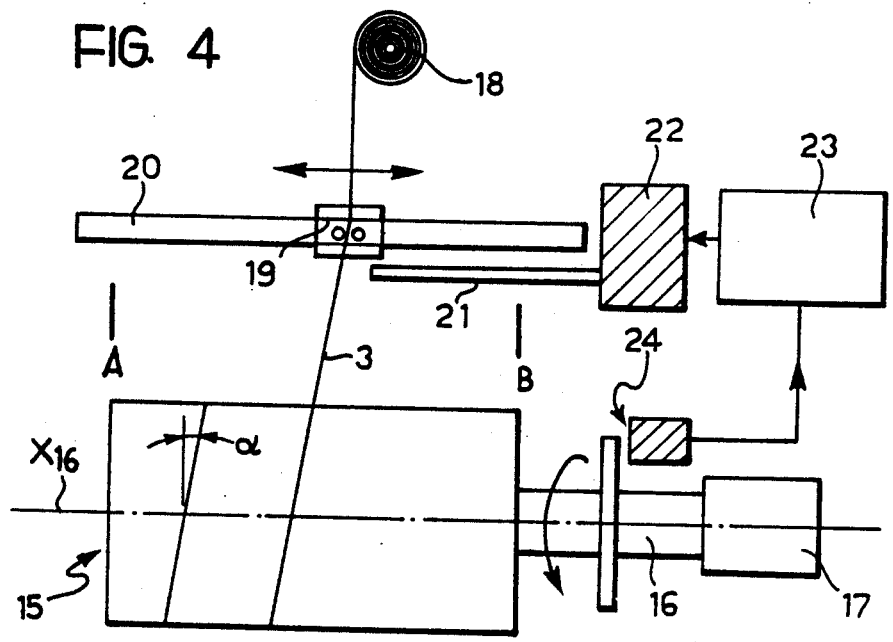

FIG. 4 shows a machine usable for carrying out the invention.

As has been seen, the present invention concerns, in particular, the criteria for the winding of the fibre which is intended to form the bundle of fibres 3 in an oxygenator such as the device 1 of FIG. 1.

For this purpose, after the winding, the fibre is subjected to a series of operations such as the application of the sealing masses to the two ends of the winding, the cutting of the sealing masses and the ends of the fibres incorporated therein and the consequent opening of the internal cavities within the fibres, any finishing operations, the mounting of the device 1 in the casing. The criteria by which these successive operations are carried out are held to be known to experts in the art and will not, therefore, be described in more detail below.

In FIG. 4, a machine generally indicated 15 is intended to form an exchange fibre 3 or a group of such fibres combined in a strip into a winding which can be used in an exchanger such as that illustrated in FIG. 1.

In general this result is achieved by the winding of the fibre or fibres 3 around a core (reel or spindle) 16 which is rotated about a central axis $X_{16}$ by a motor 17.

The structure of the machine 15 is substantially similar to that of a winder used in the textile industry.

In a machine of this type, the thread to be wound (in the case of the present invention, the fibre 3) is taken from a supply spool or bobbin 18 and guided in its path of winding on to the core 16 by a thread-guide 19 which reciprocates along a guide rail 20. The thread guide 10 is driven by a motor 22 through a shaft 21.

The speed of the thread-guide 19, and hence the speed of the motor 22, determines the pitch at which the fibre 3 is wound on to the core 16, that is, the distance between two successive turns of the wound fibre 3.

In the winding machine used for carrying out the invention, the speed of the motor 22 is not constant but is regulated by a control unit 23 (constituted, for example, by a micro- or mini-computer, by a plc or a similar device) in dependence on a signal supplied by a detector 24 (for example of the phonic wheel or encoder type) associated with the core 16. The detector 24 can generate a signal indicative of the speed of rotation of the spindle and, in general, of the number of layers of fibre 3 already wound on the core 16.

More particularly, the unit 23 controls the translational movement of the thread guide 19 in such a manner that the winding pitch p of the fibre varies as a function of the number n of layers wound, in accordance with the equation:

$$p(n) = p_0 + 2\pi . ar . \tan \alpha \quad (5)$$

where $p_0$ is an initial reference pitch (that used to wind the first layer), $\alpha$ is the angle (kept constant) of winding relative to the axis $X_{16}$ of the core and $\Delta r = n.d$ is the increase in the winding radius given by the number n of layers already wound multiplied by the diameter d of the fibre.

In accordance with this law this result may be achieved either by varying the speed of movement of the thread guide 19 along the track 20 and keeping the speed of rotation of the core 16 constant or by keeping the speed of movement of the thread guide 19 constant and reducing the speed of rotation of the core 16.

Each time the fibre 3 is near one end of the winding, a drop of adhesive may be applied to the fibre to fix it to the core or to the layers already wound so as to prevent it from being pulled away from the end of the thread guide 19 as it reverses its direction of movement.

The reversal of the direction of movement may take place either instantaneously or after the thread guide 19 has been stopped for a few moments so that a certain portion of the fibre can be wound generally perpendicular to the axis $X_{16}$ at one end of the winding. The end portions thus formed are in any case intended to be incorporated in the sealing masses 11 and 12 of FIG. 1 and then to be cut during the operation which results in the opening of the cavities within the fibres.

The program implemented by the unit 23 for controlling the speed of the thread guide 19 preferably operates continuously; this means that for each revolution of the core the pitch differs slightly from (is greater than) that for the previous revolution.

A solution is also possible, and therefore fully included within the scope of the present invention, in which the winding pitch is varied discontinuously in steps actuated at predetermined intervals, for example, at every ten revolutions of the reel, so that, taken as a whole (for example on average) the winding angle ($\alpha$), and therefore the length wound (L) are kept constant. At the limit, a single change of pitch p approximately half way through the winding could even be considered. The Applicant has been able to confirm that even this approximation leads to a considerable improvement in the operating characteristics of the oxygenator.

It should also be stated that the invention may also be used in devices in which the pitch of the path along which the fibre is wound is greater than the axial length of the winding core: this means that the fibre being wound covers the distance between the two ends of the core in less time than it takes for the core to complete a revolution around its axis.

By way of qualitative reference, it is supposed that it is wished to produce a winding for an oxygenator such as that of FIG. 1 with a total exchange surface area of approximately 3 m², a typical value for an oxygenator for an adult. The surface area in question is the outer surface area of the fibres given by the overall length of the wound fibre multiplied by its external circumference.

Fibres with an outer diameter of 0.03 cm, spaced by 0.07 cm are used to form the winding so that the pitch at which the fibres are disposed parallel to each other is 0.1 cm.

The total length of fibre corresponding to 3 m² is thus 2.1 km. If it is wound on a core (nucleus) with a diameter of 6 cm and a length of 16 cm, an initial winding pitch ($P_0$) of about 8 cm is selected, which corresponds to an angle $\alpha$ of about 23°.

On the basis of equation (3), the length wound in each layer is approximately 40 cm. The thickness of the winding is approximately 1.65 cm and the number of layers is approximately 55.

If, however, the coil were wound at a constant pitch, in accordance with the prior art, the length of a fibre with the same dimensions would increase by approximately 50%, with a reduction of approximately 50% in the oxygen flow rate in the peripheral fibres. At the same time the angle ($\alpha'$) at which the fibres cross each other would fall to approximately 12°, that is, to about half the initial value.

What is claimed is:

1. A method for winding fibres for an exchanger in which at least one fibre is wound in several layers around a winding axis at a substantially constant winding angle to said axis along a path with a winding pitch (p) which is variable according to the equation:

$$p = p_0 + 2\pi . \Delta r \tan \alpha$$

where:
$p_0$ is the pitch at which the innermost layer is wound,
$\alpha$ is the substantially constant winding angle, and
$\Delta r$ is the increase in the winding radius corresponding to the layer which is being wound.

2. The method of claim 1, wherein said variable winding pitch is incrementally variable in successive steps so as to keep the winding angle ($\alpha$) substantially constant to the axis.

3. An exchanger in which at least one fibre is wound in several layers around a winding axis at a substantially constant winding angle to said axis along a path with a winding pitch (p) which is variable according to the equation:

$$P = p_0 + 2\pi . \Delta r \tan \alpha$$

where:
$p_0$ is the pitch at which the innermost layer is wound,
$\alpha$ is the substantially constant winding angle, and
$\Delta r$ is the increase in the winding radius corresponding to the layer which is being wound wherein said variable winding pitch is incrementally variable in successive steps so as to keep the winding angle ($\alpha$) substantially constant to the axis, with a substantially-constant length of the fibre wound in each layer.

4. An exchanger in which at least one fibre is wound in several layers around a winding axis at a substantially constant winding angle to said axis along a path with a winding pitch (p) which is variable according to the equation:

$$p = p_0 + 2\pi . \Delta r \tan \alpha$$

where:
$p_0$ is the pitch at which the innermost layer is wound,
$\alpha$ is the substantially constant winding angle, and
$\Delta r$ is the increase in the winding radius corresponding to the layer which is being wound wherein said variable winding pitch is incrementally variable in successive steps so as to keep the widing angle (α) substantially constant to the axis.

5. The exchanger of claim 4, wherein a substantially constant length of the fibre is wound in each layer.

6. The exchanger of claim 5, wherein the fibre is a hollow blood-oxygen fibre, said exchanger further comprising means for supplying an oxygen bearing flow to the interior of the fibre and means for supplying blood being oxygenated to the exterior of the fibre.

* * * * *